US012542738B2

(12) United States Patent
Muntz et al.

(10) Patent No.: US 12,542,738 B2
(45) Date of Patent: Feb. 3, 2026

(54) VIRTUAL ROUTING FIELDS

(71) Applicant: CORNELIS NETWORKS, INC., Wayne, PA (US)

(72) Inventors: Gary Muntz, Lexington, MA (US); Mark Atkins, Wayne, PA (US)

(73) Assignee: Cornelis Networks, Inc., Wayne, PA (US)

( * ) Notice: Subject to any disclaimer, the term of this patent is extended or adjusted under 35 U.S.C. 154(b) by 104 days.

(21) Appl. No.: 18/544,407

(22) Filed: Dec. 18, 2023

(65) Prior Publication Data

US 2025/0202811 A1 Jun. 19, 2025

(51) Int. Cl.
*H04L 45/586* (2022.01)
*H04L 45/00* (2022.01)

(52) U.S. Cl.
CPC .......... *H04L 45/586* (2013.01); *H04L 45/566* (2013.01)

(58) Field of Classification Search
CPC ..................... H04L 45/566; H04L 45/586
See application file for complete search history.

(56) References Cited

U.S. PATENT DOCUMENTS

| | | | |
|---|---|---|---|
| 4,679,189 A * | 7/1987 | Olson | H04L 45/22 370/396 |
| 6,985,438 B1 * | 1/2006 | Tschudin | H04L 45/566 370/392 |
| 7,099,955 B1 * | 8/2006 | Gregg | H04L 61/5038 710/316 |
| 8,295,280 B2 * | 10/2012 | Gopalakrishna | H04L 45/122 370/310.1 |
| 2002/0198927 A1 * | 12/2002 | Craddock | H04L 12/46 709/200 |
| 2004/0172658 A1 * | 9/2004 | Rakib | G08B 13/19667 725/111 |
| 2008/0285560 A1 * | 11/2008 | Curtis | H04L 45/00 370/392 |
| 2009/0046583 A1 * | 2/2009 | Towster | H04L 43/0876 370/232 |
| 2011/0088005 A1 * | 4/2011 | Arsovski | G11C 15/04 716/126 |
| 2014/0269686 A1 * | 9/2014 | Srinivasan | H04L 45/58 370/357 |
| 2018/0083877 A1 * | 3/2018 | Scott | H04L 45/127 |
| 2021/0111991 A1 * | 4/2021 | Vadera | H04L 45/22 |
| 2021/0184970 A1 * | 6/2021 | Hong | H04L 49/354 |
| 2021/0328922 A1 * | 10/2021 | Yang | H04L 45/586 |
| 2021/0409310 A1 * | 12/2021 | Lan | H04L 45/04 |
| 2021/0409321 A1 * | 12/2021 | Li | H04L 45/50 |
| 2022/0360525 A1 * | 11/2022 | Hu | H04L 45/42 |
| 2023/0246957 A1 * | 8/2023 | Calciu | H04L 45/74 709/238 |
| 2023/0300065 A1 * | 9/2023 | Dong | H04L 45/24 370/389 |
| 2024/0171511 A1 * | 5/2024 | Ren | H04L 45/02 |
| 2024/0348546 A1 * | 10/2024 | Fang | H04L 45/741 |
| 2025/0106148 A1 * | 3/2025 | Dong | H04L 45/04 |

* cited by examiner

*Primary Examiner* — Jerry B Dennison
(74) *Attorney, Agent, or Firm* — H. Artoush Ohanian

(57) ABSTRACT

A switch including a plurality of ports; a management processor; and a switch core configured to receive a packet for transmission including a destination local ID ('DLID') and a virtual routing field ('VRF') augmenting the routing of the packet on a route to the DLID according to a particular routing algorithm in dependence upon the VRF.

16 Claims, 7 Drawing Sheets

VIRTUAL ROUTING FIELDS

BACKGROUND

High-Performance Computing ('HPC') refers to the practice of aggregating computing in a way that delivers much higher computing power than traditional computers and servers. HPC, sometimes called supercomputing, is a way of processing huge volumes of data at very high speeds using multiple computers and storage devices linked by a cohesive high-bandwidth, low-latency fabric. HPC makes it possible to explore and find answers to some of the world's biggest problems in science, engineering, business, and others. Artificial Intelligence ('AI') is another field of technology embracing the use of high bandwidth, low-latency fabrics.

HPC and AI systems often have many computing devices, switches, and resources arranged in fabrics with switches that support adaptive routing. It's well known that adaptive routing is highly beneficial in congested networks when the receiving nodes can keep up with the transmitters. But high-volume traffic with incast bandwidth that overloads receivers will spread congestion to far more links under adaptive routing than deterministic routing.

A classic case of this scenario is storage traffic. Typically, large numbers of compute nodes can generate high traffic to relatively few storage nodes with substantial risk of an incast problem. "Incast problem" refers to a networking phenomenon that occurs in large scale distributed computing systems where multiple nodes may simultaneously send data to fewer nodes. If the receiving nodes are not able to handle the incoming data or if the network infrastructure is not designed to handle such simultaneous events, a large amount of data traffic may converge on a single point in the network. This phenomenon is known as an "incast" problem. The challenge in such scenarios is to manage and allocate network resources effectively to prevent congestion and maintain smooth communication between the nodes.

Explicit Congestion Notification (ECN) is a feature used in computer networking to manage network congestion. ECN handles congestion without relying solely on packet drops. Network devices mark packets instead of dropping them when congestion is detected. These marks indicate to the sender that the network is experiencing congestion, without actually discarding packets. The sender then adjusts its transmission rate, accordingly, reducing the amount of data sent and helping to alleviate congestion before it becomes severe.

Explicit Congestion Notification (ECN) or related techniques can respond to high-incast scenarios, but they are not instantaneously effective, and performance can suffer significantly. The present invention complements ECN or related techniques by adding configurable isolation between incast-prone traffic and better-behaved, latency sensitive traffic, as well as load balancing and pipeline identification.

BRIEF DESCRIPTION OF THE DRAWINGS

Many aspects of the present disclosure can be better understood with reference to the following drawings. The components in the drawings are not necessarily to scale, with emphasis instead being placed upon illustrating the principles of the disclosure. Moreover, in the drawings, like reference numerals designate corresponding parts throughout the several views.

DETAILED DESCRIPTION

Figure 1:
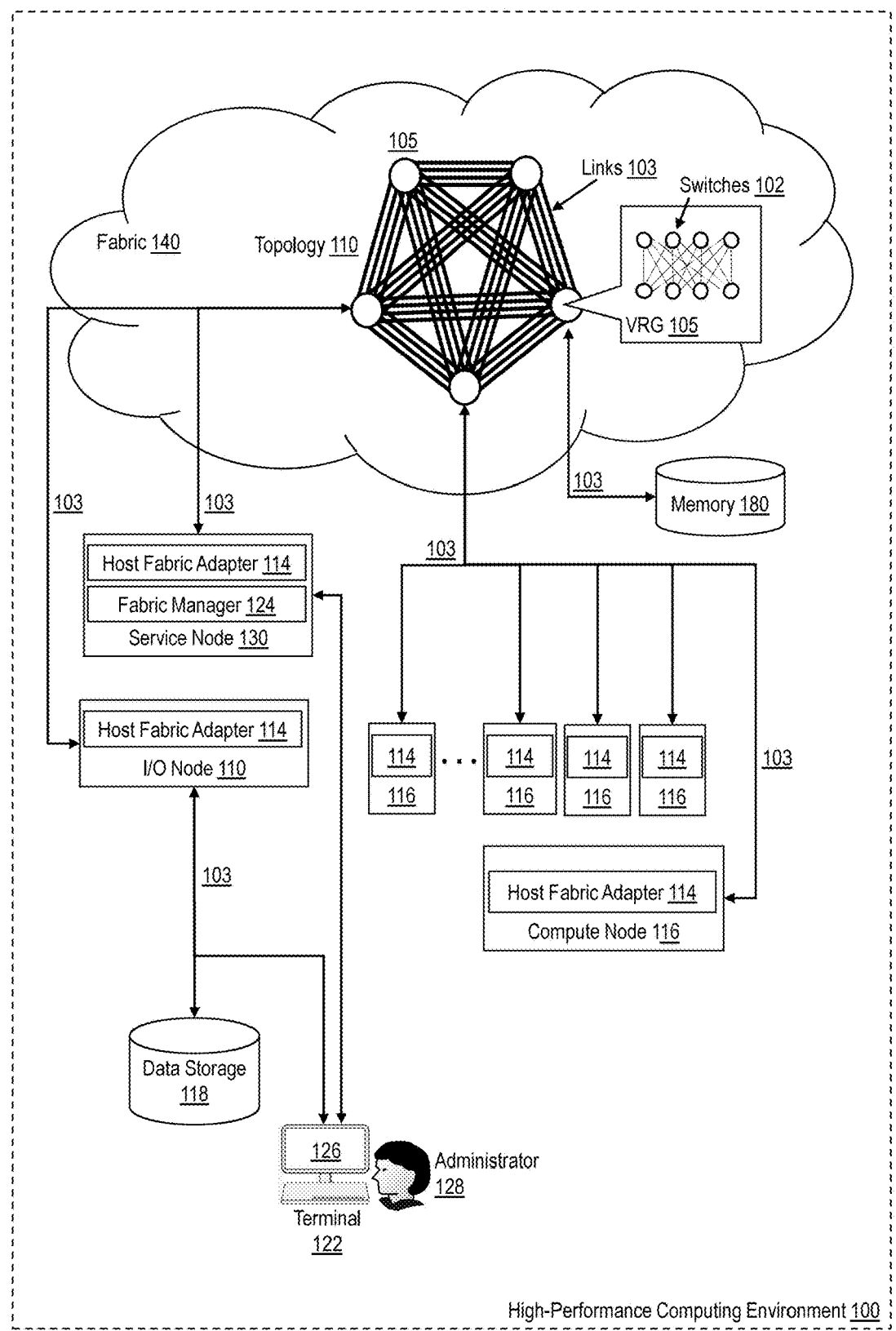
FIG. 1 sets forth a system diagram of an example high-performance computing environment useful for routing with virtual routing fields according to embodiments of the present invention.

Methods, systems, devices, and products for routing in a high-performance computing system using virtual routing fields according to embodiments of the present invention are described with reference to the attached drawings beginning with FIG. 1. FIG. 1 sets forth a system diagram of an example high-performance computing environment (100) with a fabric (140) that supports routing with virtual routing fields according to embodiments of the present invention. Virtual routing fields or 'VRFs' of the present invention are implemented as inventive fields in a hierarchical or linear LID used to augment the routing decisions of a switch when implementing a routing algorithm. VRF-enabled switches augment routing decisions packet-by-packet at one or more hops along a route from source to destination.

As its name implies, a virtual routing field is "virtual" in the sense that the traditional definition of the routing algorithm does not depend on the VRF values. A VRF references a virtual subset of physical resources of a network over which its containing packet may be routed. The packet will reach the DLID regardless of or independently of the VRF values, but when considered in the routing algorithm, the VRF adds valuable control over the path taken by the packet. VRFs provide control over packet traffic that is configurable and operates with existing routing algorithms.

FIG. 1 depicts a high-performance computing environment according to example embodiments of the present invention. The example high-performance computing environment of FIG. 1 includes an aggregation of a service node (130), an Input/Output ("I/O") node (110), a plurality of compute nodes (116) each including a host fabric adapter ('HFA') (114). The example of FIG. 1 is a unified computing system that includes a fabric (140) of interconnected HFAs, links, and switches that often look like a weave or a fabric when seen collectively.

The HFAs (114), switches (102) and links (103) of FIG. 1 are arranged in a topology (110). A topology (110) is a wiring pattern among switches, HFAs, and other components and routing algorithms used by the switches to deliver packets to those components. Switches, HFAs, and their links may be connected in many ways to form many topologies, each designed to optimize performance for their purpose. Examples of topologies useful according to embodiments of the present invention include HyperX topologies, Dragonflies, Megaflies, Trees, Fat Trees, and many others. The example of FIG. 1 depicts a Megafly topology (110) which is an all-to-all connected set of virtual router groups (105). Virtual router groups ('VRGs') (105) are themselves a collection of switches (102) with their own topology—in this case a two-tiered tree.

The switches (102) of FIG. 1 are multiport modules of automated computing machinery, hardware and firmware, which receive and transmit packets. Typical switches receive packets, inspect packet header information, and transmit the packets according to routing tables configured in the switch. Often switches are implemented as or with one or more application specific integrated circuits ('ASICs'). The hardware of the switch often implements packet routing and firmware of the switch configures routing tables, performs management functions, fault recovery, and other complex control tasks as will occur to those of skill in the art.

The switches (102) of FIG. 1 are configured for routing using VRFs according to the present invention. The switches augment the routing of a packet dictated by its routing algorithm in dependence upon one or more VRF values. As will be shown in more detail below, VRF values restrict the number of global links between virtual routing groups available to a packet. The switch augments routing decisions dictated by its routing algorithm such that the packet traverses only global links enabled by the VRF on its path to its destination.

Links (103) may be implemented as copper cables, fiber optic cables, and others as will occur to those of skill in the art. In some embodiments, the use of double density cables may also provide increased bandwidth in the fabric. Such double density cables may be implemented with optical cables, passive copper cables, active copper cables and others as will occur to those of skill in the art. An example cable useful with mirrored switch configurations according to embodiments of the present invention include QSFP-DD cables. QSFP-DD stands for Quad Small Form Factor Pluggable Double Density. The QSFP-DD complies with the IEEE802.3bs and QSFP-DD MSA standards.

The example of FIG. 1 includes a service node (130). The service node (130) of FIG. 1 provides service common to pluralities of compute nodes, loading programs into the compute nodes, starting program execution on the compute nodes, retrieving results of program operations on the compute nodes, and so on. The service node in FIG. 1 runs a service application and communicates with administrators (128) through a service application interface (126) that runs on a computer terminal (122).

The service node (130) of FIG. 1 has installed upon it a fabric manager (124). The fabric manager (124) of FIG. 1 is a module of automated computing machinery for configuring, monitoring, managing, maintaining, troubleshooting, and otherwise administering elements of the fabric (140). The example fabric manager (124) is coupled for data communications with a fabric manager administration module with a user interface ('UI') (126) allowing administrators (128) to configure and administer the fabric manager (124) through a terminal (122) and in so doing configure and administer the fabric (140).

Routing algorithms are controlled by the fabric manager (124) which in some cases configures routes from endpoint to endpoint. The fabric manager (124) of FIG. 1 also manages and publishes VRFs used by switches in augmenting routing decisions when implementing the routing algorithms for the topology. Through the use of VRFs, the fabric is itself configurable because VRFs provide the ability to virtually segment the fabric. Types of traffic, such as storage, may be isolated to particular links without requiring any physical reconfiguration or change in routing algorithm.

The compute nodes (116) of FIG. 1 operate as individual computers including at least one central processing unit ('CPU'), volatile working memory and non-volatile storage. The compute nodes are connected to the switches (102) and links (103) through a host fabric adapter (114). The hardware architectures and specifications for the various compute nodes vary and all such architectures and specifications are well within the scope of the present invention as will occur to those of skill in the art. Such non-volatile storage may store one or more applications or programs for the compute node to execute.

Each compute node (116) in the example of FIG. 1 has installed upon it or is connected for data communications with a host fabric adapter (114) ('HFA'). Host fabric adapters according to example embodiments of the present invention deliver high bandwidth and increase cluster scalability and message rate while reducing latency. The HFA adapts packets from the node for transmission through the fabric maximizing scalability and performance.

The example of FIG. 1 includes an I/O node (110) responsible for input and output to and from the high-performance computing environment. The I/O node (110) of FIG. 1 is coupled for data communications to data storage (118) and a terminal (122) providing information, resources, UI interaction and so on to an administrator (128).

Figure 2:
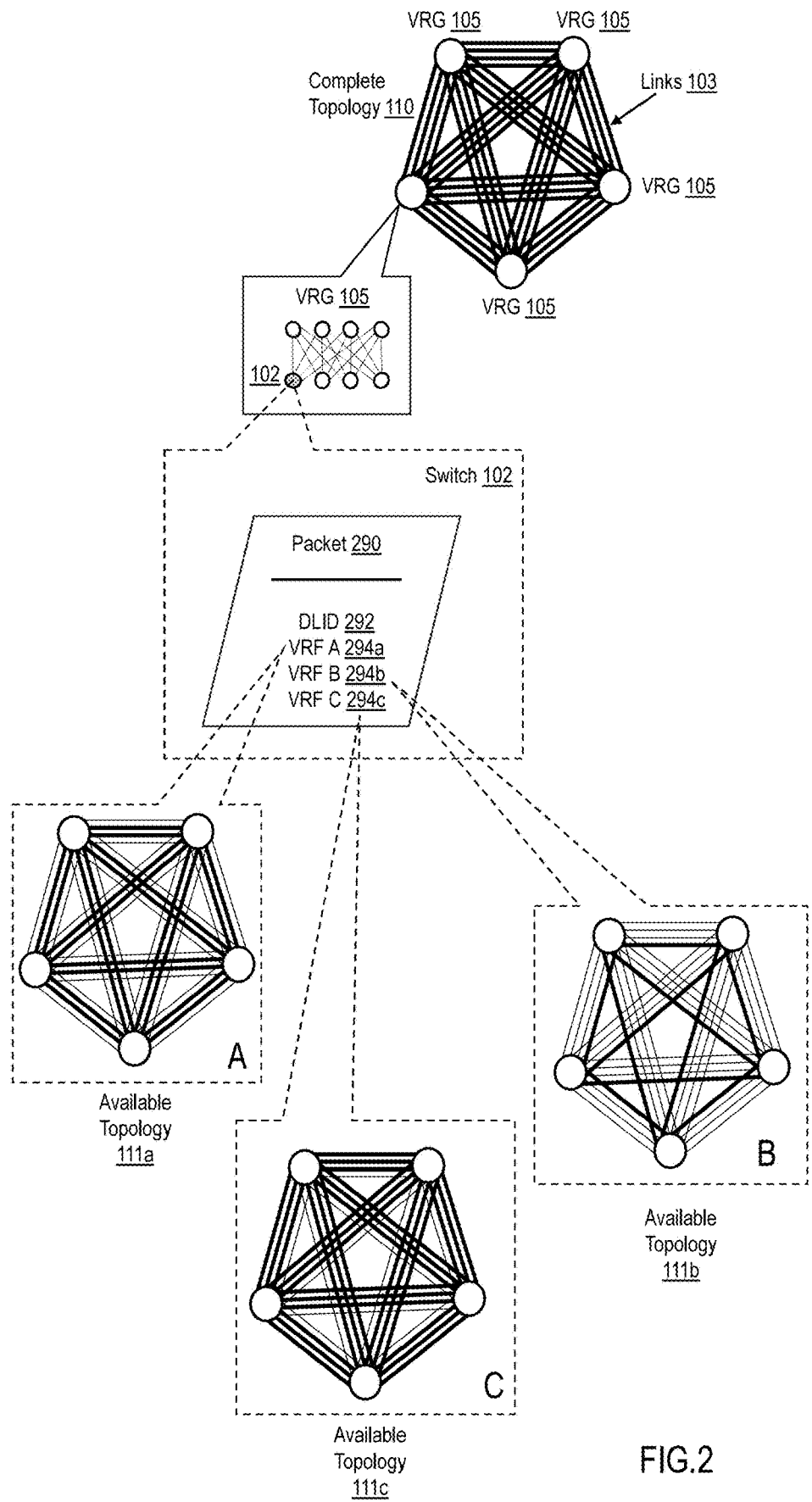
FIG. 2 sets forth a line drawing illustrating the effect of virtual routing fields for routing with virtual routing fields according to embodiments of the present invention.

As mentioned above, VRFs restrict the global links available to a packet on its route to its destination. FIG. 2 sets forth a line drawing illustrating the effect of virtual routing fields for routing in a fabric according to embodiments of the present invention. FIG. 2 illustrates five VRGs (105) in an all-to-all topology (110) with each VRG connected to every other VRG with four links (103). The example VRGs (105) are each implemented as a two-tier tree of switches (102) adapted for routing using VRFs according to embodiments of the present invention.

FIG. 2 illustrates a complete physical topology (110) of VRGs (105) connected in an all-to-all fashion with four links (103) between each VRG (104). FIG. 2 also illustrates three example available topologies (111a, 111b, or 111c) each defined by the value of a VRF (294a, 294ba, or 294c) respectively. Each VRF (294a, 294b, 294c) restricts the available links of the complete topology available to a switch in making routing decisions with a particular routing algorithm. The VRFs (294a, 294b, 294c) of FIG. 2 may be a subfield in the DLID (292) such as the VRF for traffic type discussed below with reference to FIG. 3. The switch augments the route dictated by the routing algorithm in dependence upon the value of the VRF. The links illustrated in bold are available for a given packet to traverse and the narrow lines represent links that are unavailable according to the particular VRF.

The complete topology (110) of FIG. 2 illustrates the physical topology where all the links are available for a packet to traverse between VRGs (105). Each of the VRFs (294a, 294b, 294c) define a different available topology (111a, 111b, and 111c) for routing decisions. Available topology A (111a) illustrates a reduction to 50% of the bandwidth of the global links. Similarly, available topology B (11b) includes 75% of the global links, and available topology C (111c) includes 25% of the links.

In the example of FIG. 2, available topology B (111b) and available topology C (111c) have no links in common. Such use of VRFs represent a valuable tool for isolation of traffic types which interact poorly on a single link. A switch may be enabled with more than one VRF and a resultant available topology having links enabled by both VRFs, that is overlapping links. VRFs according to embodiments of the present invention may provide full minimal and non-minimal path options among the virtual routing groups because at least one global link is maintained in the all-to-all configuration. Multiple VRFs may be used simultaneously in a given network. The VRFs act independently of all of the existing addressing, routing and quality of service (QOS) controls of the header and routing algorithms. Therefore, use of VRFs does not hamper any of those features.

The use of five VRGs and four links in the example of FIG. 2 is for ease of explanation and not for limitation. Topologies according to embodiment of the present invention may have many VRGs interconnected by many links in many ways as will occur to those of skill in the art and all such topologies are well within the scope of the present invention.

Figure 3:
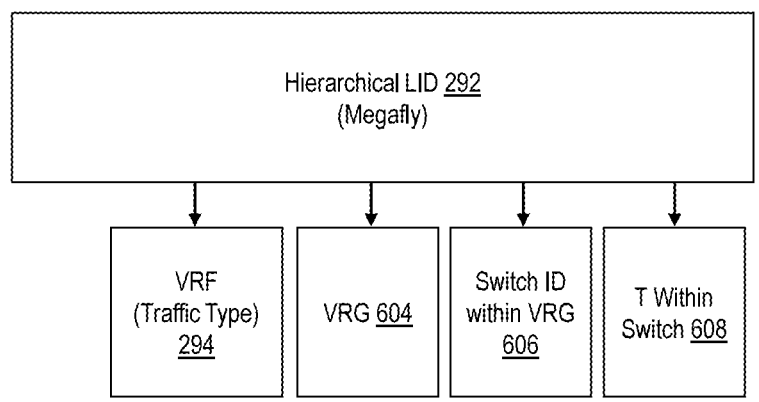
FIG. 3 sets forth a line drawing illustrating hierarchical LID including a virtual routing field for traffic type for routing according to embodiments of the present invention.

FIG. 3 sets forth a line drawing illustrating hierarchical LID (292) including a virtual routing field (294) for adaptive routing in a fabric according to embodiments of the present invention. The hierarchical LID (292) of FIG. 3 include an identification of a destination VRG (604), a destination switch ID (606) of a switch in the VRG and the identification of the terminal link (608) where the packet is ultimately destined. The VRF (294) of the hierarchical LID (292) of FIG. 3 indicates traffic type. In this example, packets of a particular type are restricted to global links enabled by the VRF (294). Examples of traffic types include storage, control message, small message, bulk compute, performance analysis, debug, and others as will occur to those of skill in the art. Although only one VRF is depicted in the example of FIG. 3, multiple VRFs may be enabled by a switch.

The function of a VRF is to add information for one or more steps of the routing algorithm through the full path of the packet. The VRF subfield is ignored from routing decision where it does not apply. To do so, VRFs according to embodiments of the present invention may be enabled or ignored at each switch in a packet's route.

The VRFs enablement is configured through the value of a LID mask employed by the switch. The VRF (204) may be adjacent to the physical HLID that it affects. While the VRF may reside adjacent to the physical HLID, the exact placement of the VRF is not a requirement and can be implementation specific.

In the example of FIG. 3, the VRF resides adjacent to the destination VRG (604), destination switch (606) and terminal link (608). LIDS delivered to an endpoint must be passed through a bitwise ternary mask to check that the LID is appropriate for the terminal link to the destination. Therefore, when the mask value enables the VRF, the switch augments the routing in dependence upon the VRF. When the mask value does not enable a VRF, the VRF is ignored at the switch and the packet is routed without augmentation according to the routing algorithm.

The example VRF of FIG. 3 designates a traffic type. In such cases, control of the network resources used by adaptive routing is achieved by restricting the egress ports considered in a switch routing decision. This control is applicable to all topologies with multiple ports used in parallels called K>1 in the HyperX terminology. Such topologies include most trees and HyperX topologies; Dragonflies, and Megaflies smaller than approximately half of the maximum possible scale, and others as will occur to those of skill in the art. The traffic type VRFs are applied independently per packet based on information in the header provided by the transmitting host. The host has the context to understand the traffic type.

LIDS delivered to an endpoint must be passed through a bitwise ternary mask to check that the LID is appropriate for the terminal link to the destination. Therefore, when the mask value enables the VRF, the switch augments the routing in dependence upon the VRF. When the mask value does not enable a VRF, the VRF is ignored at the switch and the packet is routed without augmentation according to the routing algorithm.

Some packets are not only intended for a particular destination LID but are also intended to be processed by a particular pipeline in the HFA for the destination node. In some embodiments, a packet may reach its intended destination pipeline through a specific network resource such as a plane of the network. In some embodiments, therefore, a VRF designates a plane of switches. VRFs are more flexible than traditional mechanisms for multi-pipeline cases because they can address the transition between domains of a network with differing numbers of planes.

Figure 4:
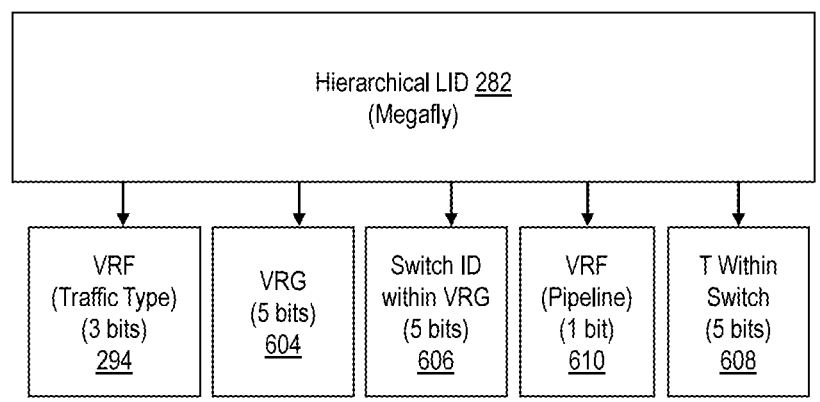
FIG. 4 sets forth a line drawing illustrating hierarchical LID including a virtual routing field for traffic type and another for pipeline designation for routing according to embodiments of the present invention.

A pipeline designation may itself be a VRF. FIG. 4 sets forth a line drawing illustrating hierarchical LID (282) including a virtual routing field (294) and a pipeline VRF (610) for adaptive routing in a fabric according to embodiments of the present invention. The hierarchical LID (282) of FIG. 4 is similar to the LID (292) of FIG. 3 in that the LID includes an identification of VRG (604), a destination switch ID (606) of a switch in the VRG and the identification of the terminal link (608) where the packet is ultimately destined.

The hierarchical LID (282) of FIG. 4 differs from the example of FIG. 3 in that the LID (282) also includes a VRF that is a pipeline designation (610). Such a pipeline destination may be used by an HFA to select a particular pipeline for processing the packet at the destination. The pipeline designation (610) is adjacent to the identification of the terminal (608) of the destination and therefore usefully provides a pipeline designation to the receiving HFA. Such a pipeline designation also may be used with host fabric adapters such as those described in U.S. patent application Ser. No. 18/504,921 entitled Host Fabric Adapter with Fabric Switch to Cornelis Networks herein incorporated by reference in its entirety.

Virtual Routing Fields may be a subfield in a hierarchical LID, a field in a linear LID or in another field in the packet header altogether. Inclusion of this control in the LID field of the packet header avoids disruption of defined packet headers and is relatively simple for host software and ASIC logic to process While reduction in max scale is possible, because global links greater than one is only for smaller systems, the impact is negligible to support a small number of traffic types. As illustrated in FIG. 4, VRFs may be discontinuous within the LID, providing multiple options for switch routing logic interpretation.

When VRFs are placed in other fields in the packet header, there is no reduction in maximum scale nor limit on the size of the set of these VRFs. There is more flexibility in the association, at a given hop, between VRFs and portions of the DLID field in the routing logic. VRFs in other fields may also provide potential for better load balancing among options for non-power-of-2 destination planes of a given VRF value.

As mentioned above, LIDS delivered to an endpoint are passed through a bitwise ternary mask to check that the LID is appropriate for the terminal link to the destination. Therefore, when the mask value enables the VRF, the switch augments the routing in dependence upon the VRF. When the mask value does not enable a VRF, the VRF is ignored.

In the example of FIG. 4, the VRF subfield for traffic type (294) is three bits, the subfield for VRG (604) is five bits, the subfield for switch ID (606) is five bits, the VRF subfield for pipeline (610) is one bit, and the subfield for terminal ID is (608) is five bits. The fields may be depicted as $T_tT_tT_t$VVVVVSSSSSPTTTTT where $T_t$ represents a bit in the VRF subfield for traffic type (294), V represents a bit in the subfield for VRG (604), S represents a bit in the subfield for switch ID (606), P represents a bit in the VRF subfield for pipeline (610), and T represents a bit in subfield for terminal ID (608). A mask value of 1110000000000100000 enables both the VRF for traffic type and the VRF for pipeline designation.

Figure 5:
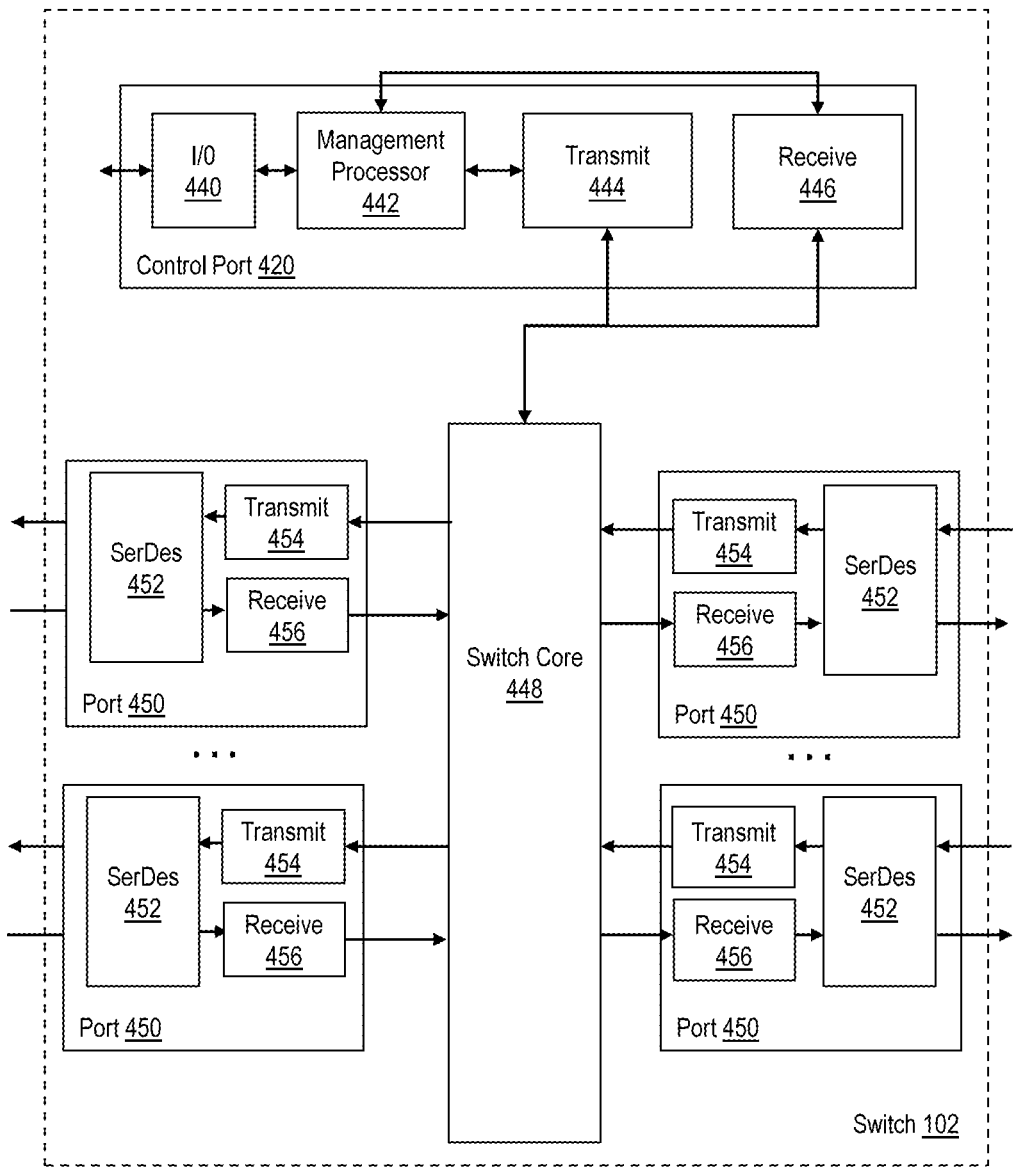
FIG. 5 sets forth a switch for routing with virtual routing fields according to embodiments of the present invention.

FIG. 5 sets forth a block diagram of an example switch capable of adaptive routing using VRFs according to embodiments of the present invention. The example switch (102) of FIG. 5 includes a control port (420), a switch core (448), and a number of ports (450). The control port (420) of FIG. 5 includes an input/output ('I/O') module (440), a management processor (442), a transmit controller (444), and a receive controller (446).

The example switch (102) of FIG. 5 includes a number of ports (450). Each port (450) is coupled with the switch core (448) and a transmit controller (454) and a receive controller (456) and a SerDes (452). The switch core (448) of FIG. 5 includes logic configured for routing in a high-performance computing system using VRFs. The switch core (448) receives a packet including at least a destination local ID ('DLID') (292) and a virtual routing field. The switch augments the routing of the packet on a route to the DLID according to a particular routing algorithm using the VRF.

The management processor (708) of the example switch of FIG. 5 maintains and updates routing tables for the switch. In the example of FIG. 5, each receive controller maintains the latest updated routing tables. The management processor (708) also maintains VRF's for augmenting routing decisions against a routing algorithm according to embodiment of the present invention. Such VRFs may be applied to all the ports of the switch or one or more individually as will occur to those of skill in the art.

The VRFs maintained by the management processor (708) may be updated by a fabric manager. The ability to update VRFs provides control over routing decisions packet-by-packet without modification of existing routing algorithms.

Figure 6:
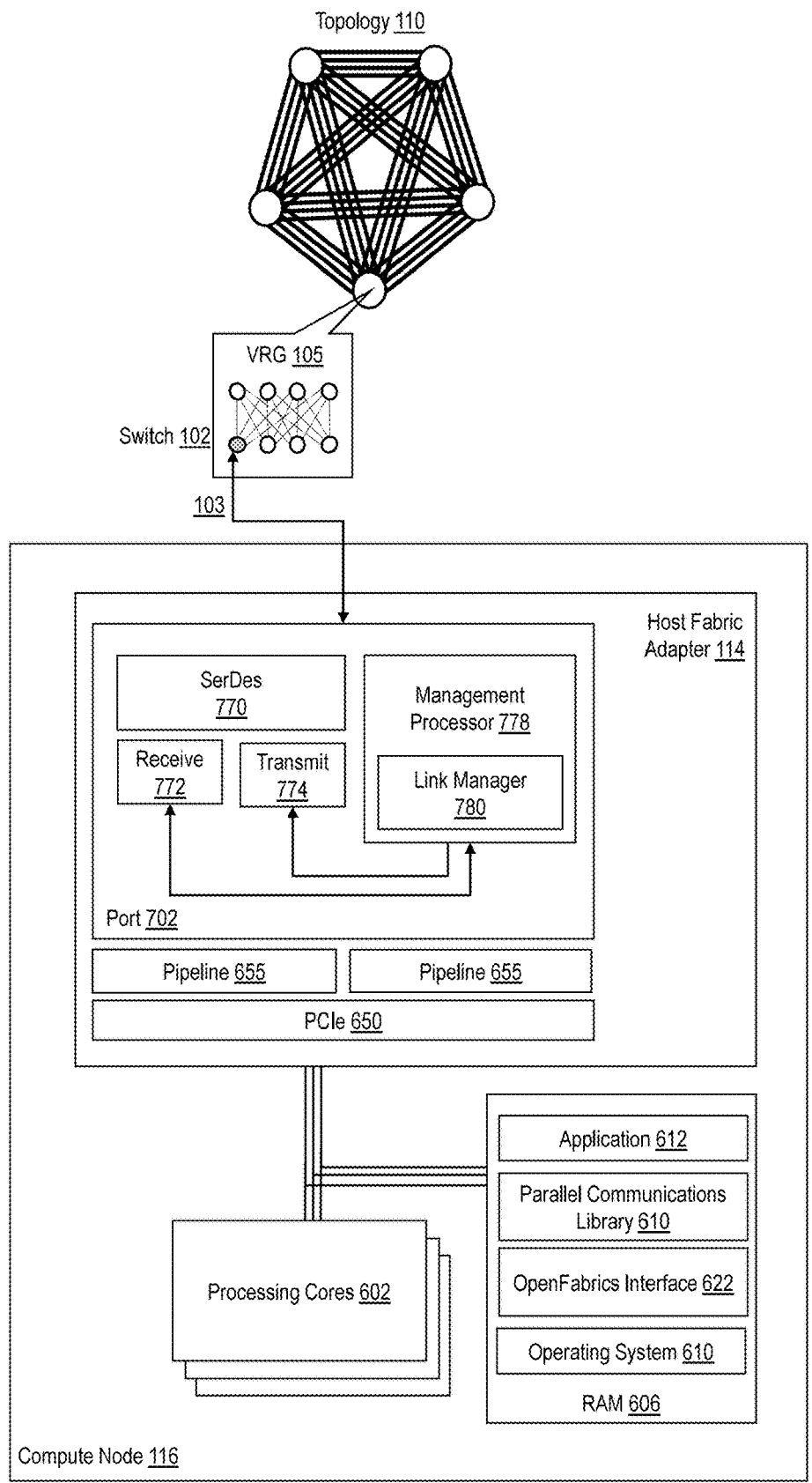
FIG. 6 sets forth a block diagram of a compute node for routing with virtual routing fields according to embodiments of the present invention.

For further explanation, FIG. 6 sets forth a block diagram of a compute node including a host fabric adapter (114) according to embodiments of the present invention. The compute node (116) of FIG. 6 includes processing cores (602), random access memory ('RAM') (606) and a host fabric adapter (114). The example compute node (116) is coupled for data communications with a fabric (140) using a link (103) to the present invention.

Stored in RAM (606) in the example of FIG. 6 is an application (612), a parallel communications library (610), an OpenFabrics Interface module (622), and an operating system (608). Applications for high-performance computing environments, artificial intelligence, and other complex environments are often directed to computationally intense problems of science, engineering, business, and others. A parallel communications library (610) is a library specification for communication between various nodes and clusters of a high-performance computing environment. A common protocol for HPC computing is the Message Passing Interface ('MPI'). MPI provides portability, scalability, and high-performance. MPI may be deployed on many distributed architectures, whether large or small, and each operation is often optimized for the specific hardware on which it runs.

OpenFabrics Interfaces (OFI), developed under the Open-Fabrics Alliance, is a collection of libraries and applications used to export fabric services. The goal of OFI is to define interfaces that enable a tight semantic map between applications and underlying fabric services. The OFI module (622) of FIG. 6 packetizes the message stream from the parallel communications library for transmission.

The compute node of FIG. 6 includes a host fabric adapter (114). The host fabric adapter (114) includes at least one fabric port (702) that includes a management processor (778), a serializer/deserializer (770); a receive controller (772) and a transmit controller (774). The management processor (778) includes a link manager (780). The port (702) is coupled to a switch (102) in a VRG (105) in a topology (110) capable of routing using VRFs according to embodiments of the present invention.

The HFA (114) of FIG. 6 includes a PCIe interconnect (650) or other such interconnect as will occur to those of skill in the art, and one or more packet processing pipelines (655). As mentioned above, VRFs according to embodiments of the present invention may designate one or more pipelines (655). Packet processing in a hardware pipeline refers to the efficient and systematic way in which switches according to embodiments of the present invention handle incoming and outgoing data packets. Hardware pipelines are optimized for parallel processing and can handle multiple packets simultaneously. They are designed to process packets quickly and reliably, which is crucial for high-speed data transmission and low-latency networking.

Figure 7:
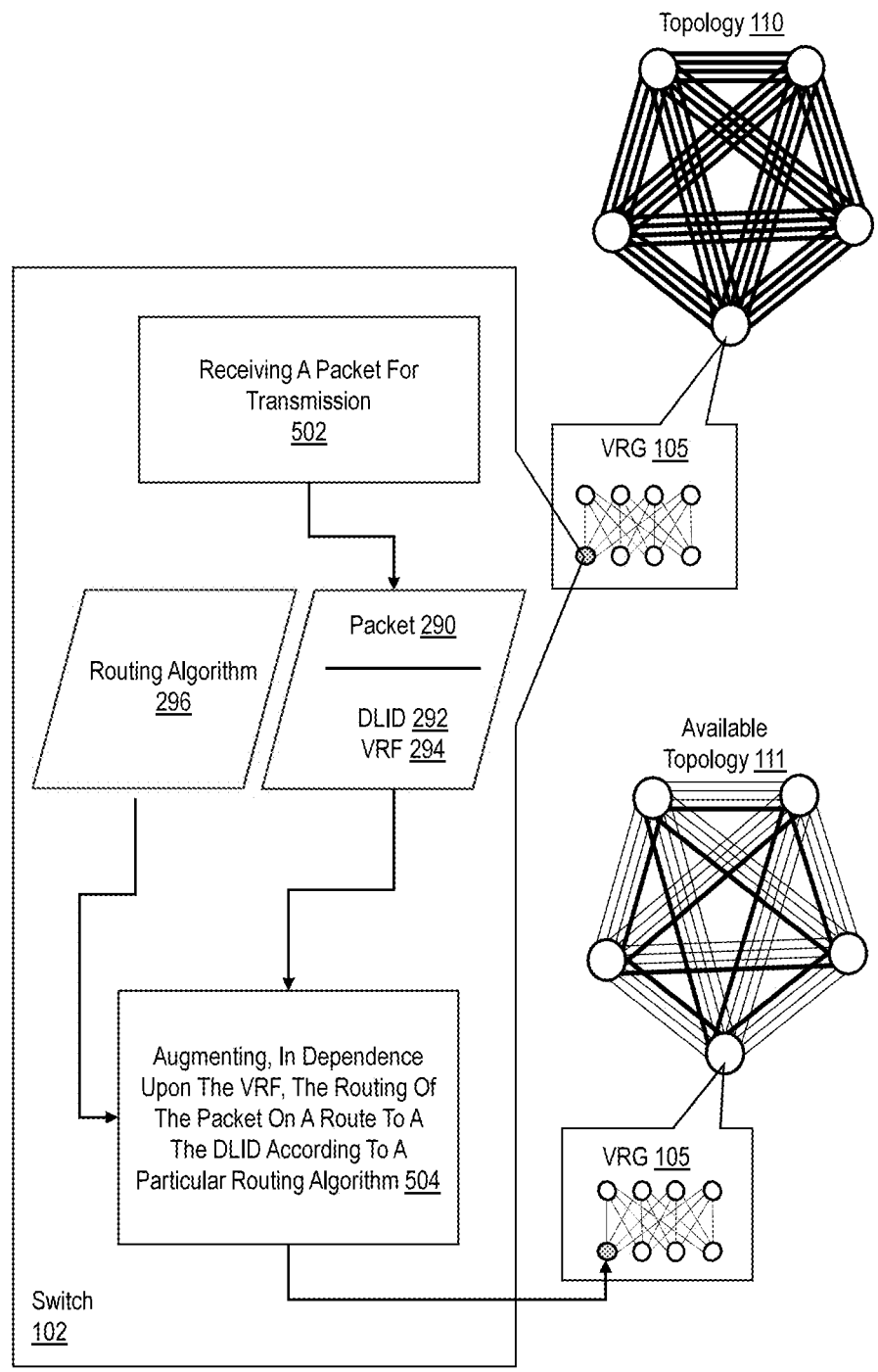
FIG. 7 sets forth a flow chart illustrating an example method of routing with virtual routing fields according to embodiments of the present invention.

FIG. 7 sets forth a flow chart illustrating an example method of routing in a high-performance computing system using virtual routing fields ('VRF') according to embodiments of the present invention. The method of FIG. 7 includes receiving (502) a packet (290) for transmission. The packet includes a destination local ID ('DLID') (292) and a virtual routing field ('VRF) (294).

The method of FIG. 7 includes augmenting (504), by the switch in dependence upon the VRF (294), the routing of the packet (290) on a route to the DLID (292) according to a particular routing algorithm. As mentioned above, the VRF augments the routing algorithm employed by the switch. Dispersive routing algorithms, adaptive routing algorithms, and deterministic routing algorithms are examples useful with VRFs according to embodiments of the present invention.

Dispersive routing algorithms aim to distribute network traffic across multiple paths, thereby avoiding congestion on any single route. These algorithms typically consider various metrics, such as network load, latency, and link utilization, to make decisions about the routing paths. U.S. patent application Ser. No. 17/806,462, entitled "Static Dispersive Routing" to Cornelis Networks, incorporated herein by reference, describes static dispersive routing algorithms that may usefully be augmented with VRFs according to the present invention.

Adaptive routing algorithms are designed to dynamically adjust routing decisions based on changing network conditions. These algorithms can adapt to factors like network traffic, link failures, or congestion, making routing decisions that optimize traffic flow in real-time. Deterministic routing algorithms use fixed, predetermined routes for data packets without considering real-time network conditions. These algorithms are static and do not adapt to changes in the network.

Switches often employ more than one routing algorithm, and in many cases, simultaneously employ different and disparage routing algorithms. Augmenting the routing of the packet according to the method of FIG. 7 includes augmenting the routing according to each of the plurality of routing algorithms. In this way, adaptive and dispersive deterministic routing algorithms simultaneously honor VRFs, applying the same link subset to both routing algorithms In many embodiments the packet includes a plurality of VRFs and augmenting the routing (508) of the packet (290) on a route to the DLID (292) according to a particular routing algorithm includes augmenting the routing (508) of the packet (290) in dependence upon the plurality of VRFs. Only ports with global links enabled by the VRF are used for transmission of the packet.

Augmenting the routing (508) of the packet (290) on a route to the DLID (292) according to a particular routing algorithm in dependence upon the VRF (294) in the example of FIG. 7 may be carried out by passing a LID definition through a ternary mask. In some embodiments, the LID definition includes a hierarchical LID definition and the VRF resides adjacent to a physical HLID. The HLID definition including the VRF is passed through a mask whose value enables the VRF. If the mask value does not enable the VRF, the VRF is ignored, and the packet is routed without augmentation.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of routing with virtual routing fields in a high-performance computing system, the method comprising:
   receiving, by a switch, a packet for transmission, the packet including a destination local ID ('DLID') and a virtual routing field ('VRF');
   augmenting, by the switch in dependence upon the VRF, the routing of the packet on a route to the DLID according to a particular routing algorithm;
   wherein augmenting the routing of the packet on the route to the DLID according to the particular routing algorithm in dependence upon the VRF further comprises passing a local ID ('LID') definition through a mask; and
   wherein the LID definition includes a hierarchical LID definition and the VRF resides in the hierarchical LID definition and wherein the switch core is configured to pass the HLID including the VRF through a ternary mask whose value enables the VRF.

2. The method of claim 1 wherein the switch supports a plurality of routing algorithms and wherein augmenting the routing of the packet on a route to the DLID according to a particular 2routing algorithm includes augmenting the routing according to each of the plurality of routing algorithms.

3. The method of claim 1 wherein the packet includes a plurality of VRFs and augmenting the routing of the packet on a route to the DLID according to a particular routing algorithm includes augmenting the routing of the packet in dependence upon the plurality of VRFs.

4. The method of claim 1 wherein the LID definition includes a linear LID definition.

5. The method of claim 1 wherein the VRF restricts traffic to a subset of global links.

6. The method of claim 1 wherein the VRF defines a plane of switches to the destination.

7. The method of claim 1 further comprising receiving, from a fabric manager, one or more VRFs.

8. The method of claim 1 wherein the VRF is the is a subfield of a hierarchical LID definition and wherein the hierarchical LID definition includes a pipeline designation.

9. The method of claim 1 wherein the VRF and the DLID reside in different fields of the packet.

10. A switch comprising:
    a plurality of ports;
    a management processor; and
    a switch core configured to receive a packet for transmission including a destination local ID ('DLID') and a virtual routing field ('VRF) and configured to augment the routing of the packet on a route to a DLID according to a particular routing algorithm in dependence upon the VRF;
    wherein augmenting the routing of the packet on the route to the DLID according to the particular routing algorithm in dependence upon the VRF further comprises passing a local ID ('LID') definition through a mask; and
    wherein the LID definition includes a hierarchical LID ('HLID') definition and the VRF resides in the HLID definition and wherein the switch core is configured to pass the HLID definition including the VRF through a ternary mask whose value enables the VRF.

11. The switch of claim 10 wherein the switch supports a plurality of routing algorithms and wherein the switch core is further configured to augment the routing according to each of the plurality of routing algorithms.

12. The switch of claim 10 wherein the packet includes a plurality of VRFs, and the switch core is configured to augment the routing of the packet in dependence upon the plurality of VRFs.

13. The switch of claim 10 wherein the LID definition includes a linear LID definition.

14. The switch of claim 10 wherein the VRF defines a plane of switches to the destination.

15. The switch of claim 10 further comprising receiving, by the management processor from a fabric manager, one or more VRFs.

16. The switch of claim 10 wherein the VRF is a subfield of a hierarchical LID definition and wherein the hierarchical LID definition includes a pipeline designation.

* * * * *